United States Patent [19]

Kawashima et al.

[11] Patent Number: 4,611,892

[45] Date of Patent: Sep. 16, 1986

[54] SYNTHETIC RESIN OPHTHALMIC LENS HAVING A SURFACE HARD COAT

[75] Inventors: Hiroshi Kawashima; Takao Mogami; Satoshi Kubota, all of Suwa, Japan

[73] Assignee: Seiko Epson Corporation, Tokyo, Japan

[21] Appl. No.: 743,539

[22] Filed: Jun. 11, 1985

[30] Foreign Application Priority Data

Jun. 11, 1984 [JP] Japan .................................. 59-119682
Feb. 5, 1985 [JP] Japan .................................. 60-20269

[51] Int. Cl.$^4$ .............................................. G02C 7/02
[52] U.S. Cl. ...................................... 351/159; 351/166; 427/160; 427/164; 427/307; 427/322; 427/412.1; 427/412.4; 427/412.5; 427/402
[58] Field of Search ............... 427/160, 164, 307, 322, 427/412.4, 412.5, 412.1, 402; 351/166, 159; 350/409, 165; 526/292.3, 292.4; 252/79.5; 156/668

[56] References Cited

U.S. PATENT DOCUMENTS

| | | | |
|---|---|---|---|
| 2,968,538 | 1/1961 | Chapman | 156/668 |
| 3,445,264 | 5/1969 | Daines | 427/322 |
| 3,519,462 | 7/1970 | Bristol et al. | 427/164 |
| 3,586,504 | 6/1971 | Coates et al. | 252/79.5 |
| 3,725,108 | 4/1973 | Saubestre et al. | 427/307 |
| 4,131,698 | 12/1978 | Deckert | 252/795 |
| 4,306,780 | 12/1981 | Tarumi et al. | 351/159 |
| 4,382,983 | 5/1983 | Yuyama et al. | 427/164 |
| 4,393,184 | 7/1983 | Tarumi et al. | 526/292.4 |

FOREIGN PATENT DOCUMENTS

| | | | |
|---|---|---|---|
| 653497 | 12/1962 | Canada | 252/79.5 |
| 0081164 | 7/1981 | Japan | 427/164 |

*Primary Examiner*—Norman Morgenstern
*Assistant Examiner*—Janyce A. Bell
*Attorney, Agent, or Firm*—Blum Kaplan Friedman Silberman and Beran

[57] ABSTRACT

An improved synthetic resin opthalmic lens and a method for treating the surface of the lens are provided. The lens is formed by polymerizing at least one bis(allyloxycarbonyloxy-alkoxy) dihalide-phenyl alkane and one bifunctional allyl compound, optionally with a bis-(allylcarbonate) compound. The lens is chemically treated with an aqueous solution of polyethyleneglycol and an alkali metal hydroxide and a surface hard coat is formed on the treated surface.

42 Claims, No Drawings

SYNTHETIC RESIN OPHTHALMIC LENS HAVING A SURFACE HARD COAT

BACKGROUND OF THE INVENTION

This invention relates to a method for modifying the surface of a plastic material, and more particularly, to a method for modifying the surface of plastic lenses by forming a surface hard coat on the lens.

Synthetic resin lenses are used widely in the field of optics as ophthalmic lenses due to their safety, ease of manufacture and light-weight. Additionally, recent progress in flex prevention techniques and hard coating have further aided in the manufacture and wide use of synthetic resin ophthalmic lenses.

In the ophthalmic field there is strong demand for high-quality plastic lenses that have a high refractive index. A number of prior art references teach the manufacture of a high refractive index resin for use in ophthalmic lenses. These include the following Laid Open Japanese Patent Applications:

1. No. 54-41965 which teaches using a copolymer of diethyleneglycolbis(allylcarbonate) and benzylmethacrylate:
2. No. 54-77686 which teaches using a copolymer of diethyleneglycolbis(allylcarbonate) and 4-iodostyrene;
3. No. 58-15513 which teaches using a copolymer of diallylterephthalate or diallylisophthalate with a methylmethacrylate prepolymer;
4. No. 55-13747 which uses the copolymer of bisphenol A diemethacrylate and phenylmethacrylate or benzylmethacrylate; and
5. Nos. 57-54901 and 58-18602 which use a styrene monomer and a copolymer of di(metha)acrylate having a halogen substituted aromatic ring and an allyl compound or a bifunctional di(metha)acrylate.

The lens produced using the copolymers taught in the these publications are not fully satisfactory for the following reasons. For the lenses produced by the references in 1, 2 and 3 the problem arises in the process for reacting the allyl group and the (metha)acryl or vinyl group which have different rates of reactivity. The (metha)acryl group or vinyl group are fast reacting and polymerize first. The allyl group is slow reacting and polymerizes later. As a result, copolymerization does not occur. Incomplete polymerization of the allyl compound causes deterioration of heat resistance and solvent resistance the resulting lenses.

Since the (metha)acryl or vinyl compound which polymerizes first is a unifunctional monomer, these compounds are not completely polymerized or incorporated into the polymer chain. Rather, the compounds are partially extracted as a monomer which further reduces heat resistance of the resulting lens. An additional shortcoming is that the lenses manufactured in accordance with the methods taught in these publications have a refractive index lower than satisfactory.

In the method of publication 4, the reactivity of the (metha)acryl and vinyl group are similar. However, it is difficult to control the various processing conditions during manufacture of the lens. Specifically, because the (metha)acryl and vinyl groups react fast, it is difficult to control casting. Distortion occurs inside or on the lens surface which produces optical defects. Furthermore, since the vinyl and (metha)acryl groups are very sensitive to environmental conditions, it is difficult to control such conditions in addition to the polymerization conditions. Moreover, since the second monomer is unifunctional, heat resistance of the lens is reduced.

Publications Nos. 57-54901 and 58-18602 provide lenses having a high refractive index. However, the manufacturing process is extremely complex due to difficulties in controlling polymerization conditions and in completing polymerization.

In order to overcome the above deficiencies in the prior art, the resin described herein was developed. The resin has excellent chemical resistance and stable physical properties. However, it is difficult to adhere an inorganic deposition film or hard-coating layer of organic silicon, organic acryl or other similar compounds onto the surface. Generally used surface treatment methods, such as plasma treatment described in "Industrial Material" Vol. 29, No. 2, pp. 105-115 (1983), or flame treatment described in Japanese Laid Open Application No. 57-49374 are not suitable for use with the new synthetic resin lens.

Accordingly, it is desirable to provide an improved synthetic resin lens and a method for modifying the surface of the synthetic resin lens in order to form an inorganic film or hard-coating layer securely thereon.

SUMMARY OF THE INVENTION

Generally speaking, in accordance with the invention, an improved synthetic resin ophthalmic lens and a method for treating the surface are provided. The lens is formed by polymerizing at least one bis(allyloxycarbonyloxy-alkoxy) dihalidephenyl alkane and one bifunctional allyl compound, optionally with a bis(allylcarbonate) compound. The lens is chemically treated with an aqueous solution of polyethyleneglycol and an alkali metal hydroxide. A surface hard coat is then formed on the treated surface.

The synthetic resin lens is formed by polymerizing at least one bis(allyloxycarbonyloxy-alkoxy) monomer represented by formula (1) and one bifunctional allyl monomer represented by formula (2):

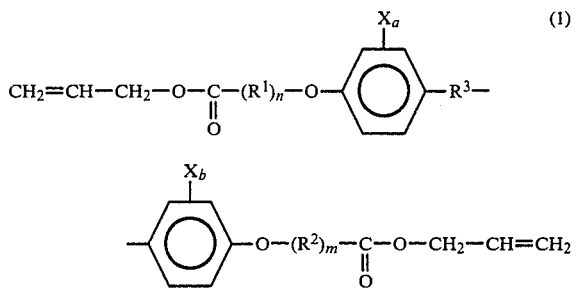

wherein $R^1, R^2$ stands for one of $-OCH_2CH_2-$, $OCH_2CH_2CH_2-$,

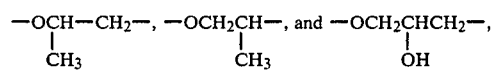

$R^3$ stands for one of $-O-$, $-S-$, $-SO_2-$, $-CH_2-$, and

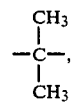

X is halogen except fluorine, a, b are integers from 1 to 4 and m, n are integers from 0 to 4.

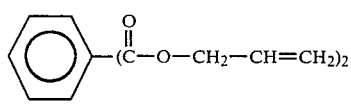

The base lens may also include at least one bis(allylcarbonate) monomer represented by formula (3):

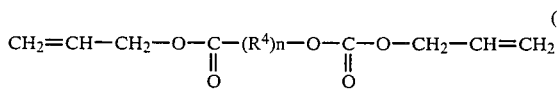

wherein $R^4$ stands for one of —OCH$_2$CH$_2$—, —OCH$_2$CH$_2$CH$_2$—,

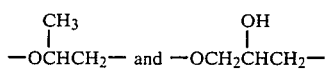

and n is an integer from 1 to 6.

The surface of the base lens is chemically treated with an aqueous solution of polyethyleneglycol and an alkali metal hydroxide prior to forming a surface hard coat of a silane resin or a photosetting resin.

The silane resin surface hard coat includes at least one silane compound selected from the group of compounds of formulas (4) and (5):

wherein $R^5$ stands for an organic group including a hydrocarbon group having 1 to 6 carbon atoms, vinyl group, methacryloxy group amino group, mercapto group, or epoxy group, $R^6$ stands for a hydrocarbon group having 1 to 5 carbon atoms, acyl, alkoxy, alkyl or hydrogen, $R^7$ stands for a hydrocarbon group having 1 to 5 carbon atoms, alkoxyalkyl group or hydrogen and c is an integer equal to 0 or 1;

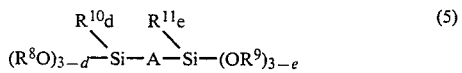

wherein $R^8$ and $R^9$ stand for an alkyl group having 1 to 4 carbon atoms, $R^{10}$ and $R^{11}$ stand for an organic group or a hydrocarbon group having 1 to 6 carbon atoms, a vinyl group, a methacryloxy group, an amino group, a mercapto group or an epoxy group, A stands for a bivalent hydrocarbon group or a bivalent organic group including oxygen or sulfur and d and e are equal to 0 or 1; and colloidal silica having a particle diameter between about 1 to 100 mμ;

at least one compound selected from the group consisting of multifunctional epoxy compounds, polyhydroxy alcohol compounds and polycarboxylic acid compounds and anhydrides thereof; and magnesium perchlorate.

The photosetting surface hard coat includes a compound having at least two (metha)acryl groups.

Accordingly, it is an object of the invention to provide an improved a synthetic resin ophthalmic lens.

Another object of the invention is to provide a method for preparing an improved synthetic resin ophthalmic lens having increased adherance of a surface hard coat to the lens base.

It is a further object of the invention to provide an improved method for treating the surface of a synthetic resin ophthalmic lens to increase the adherance of a surface hard coat to the lens base.

Still another object of the invention is to provide an improved method for forming a synthetic resin ophthalmic lens having high abrasion resistance.

Yet another object of the invention is to provide an improved method for forming a synthetic resin ophthalmic lens having a high refractive index.

Still other objects and advantages of this invention will in part be obvious and will in part be apparent from the specification.

The invention accordingly comprises the several steps and the relation of one or more of such steps with respect to each of the others, and the composition possessing the features, properties, and the relation of components, which are exemplified in the following detailed disclosure, and the scope of the invention will be indicated in the claims.

DESCRIPTION OF THE PREFERRED EMBODIMENTS

A synthetic resin ophthalmic lens in accordance with this invention includes a lens base by polymerizing at least one bis(allyloxycarbonyloxyalkoxy)-dihalidephenyl alkane monomer represented by formula (1):

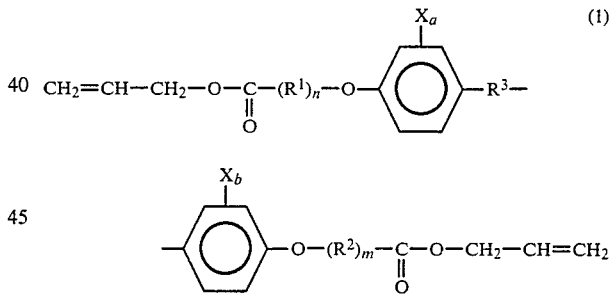

wherein $R^1$, $R^2$ stands for one of —OCH$_2$CH$_2$—, OCH$_2$CH$_2$CH$_2$—,

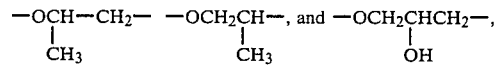

$R^3$ stands for one of —O—, —S—, —SO$_2$—, —CH$_2$—, and

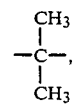

X is halogen except fluorine, a, b are integers from 1 to 4 and m, n are integers from 0 to 4; and at least one diallyphthalate monomer represented by formula (2):

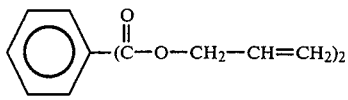 (2)

The base lens may also include at least one bis(allylcarbonate) monomer represented by formula (3):

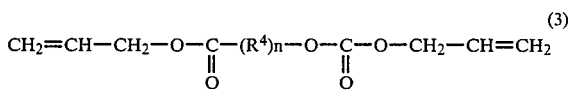 (3)

wherein $R^4$ stands for one of $-OCH_2CH_2-$, $-OCH_2CH_2CH_2-$,

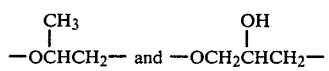

and n is an integer from 1 to 6.

In manufacturing the synthetic resin lens, the monomer of formula (1), which is solid at room temperature, is dissolved in a solution containing the monomers of formula (2) or the monomers of formulas (2) and (3). The proportions of the three monomers is determined according to the desired refractive index of the lens. The relative amounts of each monomer is also determined by the durability, impact resistance and heat resistance of the resin lens.

The monomer of formula (1) has the highest refractive index of the three monomers. In general, the halogen substituents in the formula are chlorine, bromine or iodine. Iodine is preferred since it improves the refractive index and durability of the lens.

The concentration of the monomer of formula (1) depends on its solubility in the solution containing the monomers of formulas (2) and (3). In order to improve the properties, such as refractive index, dyeability, adhesion and inflamability, the compounds of formula (1) are included in an amount between about 25 to 80 weight percent.

The monomers of formula (1) preferably include the following compounds:

2,2-bis(4-allyloxycarbonyloxy-3,5-dichlorophenyl)propane,
2,2-bis(4-allyloxycarbonyloxy-3,5-dibromophenyl)propane,
2,2-bis[4-(2-allyloxycarbonyloxyethoxy)-3,5-dichlorophenyl]propane,
2,2-bis[4-(2-allyloxycarbonyloxyethoxy)-3,5-dibromophenyl]propane,
2,2-bis[4-(2-allyloxycarbonyloxyethoxy)-2,3,5,6-tetrabromophenyl]-propane,
2,2-bis[4-(2-allyloxycarbonyloxy)-3,5 dibromophenyl]-propane,
2,2-bis[4-3-allyloxycarboxyloxypropoxy)-3,5-dibromphenyl]propane,
2,2-bis[4-(2-(2-allyloxycarbonyloxyethoxy)-3-hydroxypropoxy)-3,5-dibromophenyl]-propane,
2,2-bis[4-(3-allyloxycarbonyloxy)-3-hydroxypropoxy)-3,5-dibromophenyl]-propane,
bis(4-allyloxycarbonyloxy-3,5-dibromophenyl)sulfide,
bis[4-(2-allyloxycarbonyloxyethoxy)-3,5-dibromophenyl]sulfide,
bis[4-(2-allyloxycarbonyloxyethoxy)-3,5-dichlorophenyl]sulfide,
bis[4-(2-allyloxycarbonyloxyethoxy)-3,5-dibromophenyl]sulfone,
bis[4-(2-allyloxycarbonyloxyethoxy)-3,5-dibromophenyl]ether, and
bis[4,(2-allyloxycarbonyloxyethoxy)-3,5-dibromophenyl]methane.

The diallyphthalate monomers of formula (2) include diallylorthophthalate, diallylisophthalate or diallylterephthalate. They may be used either alone or in combination. Polymerization of the diallyphthalate compounds of formula (2) results in a plastic material. However, the resulting plastic material is low in quality and the adhesion to a surface hard coat, dyeability with a dispersed dye and impact resistance are low. Accordingly, a synthetic resin lens base formed only of compounds of formula (2) is not satisfactory.

A monomer of formula (2) is included for increasing solubility of the monomer of formula (1) and making the solution suitable for casting. Thus, after a compound of formula (1) is added to the solution, the solution is injected into a casting mold at room temperature. Additionally, the compound of formula (2) prevents a decrease in the refractive index of the resin formed from the compound of formula (1). Alternatively, a compound other than the compound of formula (2) may be added in order to prevent a drop in the refractive index; however, the diallyphthalates are preferred. They are advantageous since a diallyl compound facilitates control of the reaction rate. Also, since the diallylphthalates are bifunctional, only a small amount of monomer fails to react during polymerization.

The diallyphthalates are included in a concentration preferably between about 5 to 75 weight percent. If the concentration is greater than 75 percent, a lens has an undesirable color such as a yellowish color and has reduced adhesion to a surface hard coat. On the other hand, if the concentration is less than 5 weight percent, dyeability and impact resistance are reduced.

Dially compounds of formula (3) may also be added when forming the synthetic resin lens in order to improve dyeability of the lens as well as improve durability and impact resistance and adhesion to an applied surface hard coat. Polymerization is not affected by adding this compound which aids in controlling the refractive index of the lens. For example, it is often desirable to add diethyleneglycolbisallylcarbonate as the third constituent to improve impact resistance, light resistance, dyeability and adhesion to a surface hard coat and add naphthalene dicarboxylic acid diallyl for improving the refractive index further. Additionally, by adding diallyl tartrate, adhesion with a glass mold is improved. Additionally, additives such as ultra-violet light absorbers, antioxidants and the like may be added to improve durability as desired.

The particular characteristics of a lens which includes the compounds of formula (3) vary with $R^4$ and n in the compound. If $R_4$ is $-OCH_2CH_2-$, and n=2, the lens has excellent dyeability and if n=4 or 5, the compound improves durability and impact resistance of the surface a hard coat.

The compounds of formulas (1) and (2) produce a lens having a high-refractive-index, whereas a lens made solely of a compound of formula (3) would have a refractive index of about 1.5. Consequently, the compounds of formula (3) preferably are included in a concentration between about 10 to 50 weight percent. In this range, a synthetic resin lens having a high refractive index and improved fire resistance is obtained.

The compounds of formula (3) include:
ethyleneglycolbis(allylcarbonate),
diethyleneglycolbis(allylcarbonate),
triethyleneglycolbis(allylcarbonate),
tetraethyleneglycolbis(allylcarbonate),
hexaethyleneglycolbis(allycarbonate),
(poly)propyleneglycolbis(allycarbonate),
trimethyleneglycolbis(allylcarbonate),
3-hydroxypropoxypropanolbis(allylcarbonate),
glycerolbis(allylcarbonate),
diglycerolbis(allylcarbonate), and
triglycerolbis(allylcarbonate).

A lens manufactured in accordance with the invention has improved properties since all the monomers are cross-linked. The lens has a high refractive index and improved heat resistance, solvent resistance and dyeability. The lens may also be easily handled during manufacture. The lens is inflamable due to inclusion of compounds of formula (1).

The lens in accordance with the invention is obtained by polymerizing the comonomers of formulas (1), (2) and optionally (3) in the presence of a radical polymerization initiator. The radical polymerization initiator is not limited to a specific type, but may be selected from conventional initators. Suitable radical polymerization initiators include, for example peroxide. The peroxides include hydroperoxides, such as t-butylhydroperoxide, dialkylperoxides, such as di-t-butylperoxide, diacylperoxides, such as benzoylperoxide and laurylperoxide, peroxydicarbonates, such as diisopropylperoxydicarbonate, di-2-ethylhexylperoxydicarbonate and di-n-propylperoxydicarbonate, peroxyesters such as t-butylperoxypiverate, t-butylperoxyisobutylate, and t-butylperoxy-2-ethylhexanoate ketoneperoxides, and peroxyketales, azo-compounds such as $\alpha,\alpha$azobis(isobutylnitrle), and 1bis(t-butylperoxy)3,3,5-trimethylcyclohexane.

The concentration of radical polymerization initiator depends on the monomers used in forming the lens and the polymerization conditions. Preferably, the concentration ranges from about 0.1 to 5.0 weight percent.

Polymerization may be also initiated by the use of light energy or radiations, for example, ultraviolet light or X-ray radiation. When using ultraviolet light, an ultraviolet light sensitizing agent may be added in order to promote polymerization.

It is often desirable to alter properties of the lens or to improve the manufacturing process. Additives such as ultraviolet light absorbers, anti-oxidants, anti-electricants, dyes, photochromic agents, stabilizers, and mold releasing agents may be added as desired.

A synthetic resin lens formed in accordance with the invention has a high refractive index, improved dyeability and minimal optical distortion. While the surface of the lens is hard it will abrade easily. Thus, the resin lens base prepared in accordance with the invention is not fully satisfactory for use as an ophthalmic lens. It is difficult to apply a surface hard coat to the base lens. Accordingly, in accordance with the invention, after preparing a synthetic resin lens base including the compounds of formulas (1), (2) and optionally (3), the surface of the lens is chemically treated with an aqueous solution of polyethyleneglycol and an alkali metal hydroxide.

The alkali metal hydroxide is preferably sodium hydroxide or potassium hydroxide. The concentration of the hydroxide should be between about 0.1 and 30.0 weight percent. If the concentration is less than about 0.1 percent, the time required to treat the surface of the lens is increased. Conversely, if the concentration is greater than about 30 weight percent, the viscosity of the aqueous solution increases to a point where the solution become unsuitable for chemically treating the surface of the lens.

The polytheleneglycol used has a molar weight between about 100 to 4000. The effect of adding polytheleneglycol to the aqueous solution is to activate anions produced by the alkali metal and increase the surface energy so that the surface of the lens may be easily activated by the anions. This effect is reduced if the molecular weight is less than 100 or greater 4000. Furthermore, if the molecular weight falls outside of this range, solubility of the polytheleneglycol is reduced. The effect is obtained when the polytheleneglycol is added in an amount between about 1 to 35 weight percent, but not outside this range.

As a surfactant has a similar effect as the polyethyleneglycol, a surfactant can be used instead of the polyethyleneglycol in the treating solution. The surfactant may be a non-ionic or anionic surfactant. Suitable non-ionic surfactants include compounds from the monoglyceryte series, the sorbitan fatty acid ester series, the cane sugar ester series, the polyoxyethylene ethers of higher alcohols series, the polyoxyethylene esters of higher fatty acids series, the polyoxyethylene ethers of sorbitan esters series, the fatty acid alkanoleamide series, the polyoxyethylene fatty acid amide series, the polyoxyethylenealkylamine series and the block polymer of polypropylene and polyoxyethylene series and the like.

Suitable anionic surfactants include straight-chain alkylbenzenesulfonic acid salts and $\alpha$-olefin sulfonic acid salts and the like.

The addition of a surfactant in combination with the hydroxide enhances activation of the alkali metal anion. Consequently, when the aqueous solution is applied to the synthetic resin lens, the surface energy of the lens increases and the lens surface becomes hydrophilic. Moreover, the addition of surfactants improves surface washability, wetness, solubilizability, diffusability, emulsificabilty, re-deposition and so on.

Since the aqueous solution in accordance with the invention is water soluble, hydrophilic surfactants are used. Concentration of the surfactant should be greater than $1 \times 10^{-2}$ weight percent and preferably between $1 \times 10^{-2}$ and 5 weight percent. If the surfactant is present in amount less than $1 \times 10^{-2}$ weight percent, surface washability of the lens is reduced. If the surfactant is present in an amount greater than 5 weight percent, surface washability deteriorates and unexpected results may occur.

The solvent medium should be water without alcohol such as methanol or isopropanol since alcohol may attack the surface of the resin and thereby deteriorate the lens surface.

After chemically treating the surface of the lens with an aqueous solution of polyethyleneglycol and an alkali metal hydroxide, a surface hard coat of a silicon resin or an acryl photosetting resin is deposited on the lens surface. The silicon surface hard coat is formed from at least one of the compounds of formula (4) and formula (5), one of a multifunctional epoxy compound, polyhydroxy alcohol, polycarboxylic acid and polycarboxylic acid anhydride, magnesium perchlorate and colloidal silica. The photosetting resin is formed from at least one compound including at least two (metha) acryl groups, colloidal silica and a photopolymerization initiator.

The compounds of formula (4) are as follows:

 (4)

wherein $R^5$ is a group selected from the group consisting of a hydrocarbon having from 1 to 6 carbon atoms, vinyl, methacryloxy, amino, mercapto and epoxy, $R^6$ is a hydrocarbon having 1 to 5 carbon atoms, acyl, alkoxy, alkyl or hydrogen, $R^7$ is a hydrocarbon having 1 to 5 carbon atoms, alkoxyalkyl or hydrogen and c is 0 or 1.

Compounds represented by formula (4) include:
methyltrimethoxysilane,
ethyltriethoxysilane,
methyltriethoxysilane,
phenyltrimethoxysilane,
dimethyldimethoxisilane,
phenylmethyldimethoxysilane,
vinyltriethoxysilane,
vinyltris β-methoxy-ethoxy)-silane,
vinyltriacetoxysilane,
γ-glycidoxypropyltrimethoxysilane,
γ-glycidoxypropylmethyldiethoxysilane,
β-(3,4-epoxycyclohexyl)ethyltrimethoxysilane,
γ-aminopropyltriethoxysilane,
N-β-(aminoethyl)-γ-aminopropyltrimethoxysilane,
N-bis(β-hydroxyethyl)-γ-aminopropyltriethoxysilane,
N-β-(aminoethyl)-γ-aminopropyl(methyl)dimethyoxysilane, and
γ-mercaptopropyltrimethoxysilane.

The compound of formula (4) is preferably hydrolized in an organic solution, such as alcohol in the presence of an acid.

A second silicon compound which may be used in the surface hard coat and is represented by formula (5):

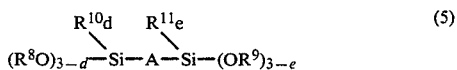 (5)

wherein $R^8$ and or $R^9$ are the same or different alkyl groups having 1 to 4 carbon atoms, $R^{10}$ and $R^{11}$ are the same or different organic groups including hydrocarbon groups having from 1 to 6 carbon atoms, vinyl, methacryloxy, amino, mercapto or epoxy groups, such as methyl, ethyl, propyl, butyl, cyclohexyl, cyclopentyl, vinyl, allyl, phenyl, or other groups in which hydrogen atoms are at least partiallyy substitued by halogen atoms, mercapto atoms, a glycidoxy group, a (metha)acryloxy group, an amino group and the like, A is a bivalent hydrocarbon or organic group including an oxygen or sulfur atom such as: —CH$_2$—, —CH$_2$CH$_2$—, —CH$_2$CH$_2$CH$_2$,

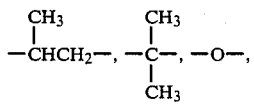

—(CH$_2$)$_3$S(CH$_2$)$_2$—,        —(CH$_2$)$_3$S(CH$_2$)$_3$—,
—(CH$_2$)$_2$S(CH$_2$)S(CH$_2$)$_2$—, —(CH$_2$)$_2$O(CH$_2$)$_2$O(CH$_2$)$_2$—;   —(CH$_2$)$_3$O(CH$_2$)$_3$—,   —(CH$_2$)$_3$S(CH$_2$)$_3$S(CH$_2$)$_3$—, and d and e are equal to 0 or 1.

Preferably, the surface hard coat is formed from at least one compound selected from the compounds of formulas (4) and (5).

The surface hard coat may also contain at least one of the compounds from the group of multifunctional epoxy compounds, polyhydroxy alcohols, polycarboxylic acids, and polycarboxylic acid anhydrides.

Suitable multifunctional epoxy compounds include diglycydilethers of bifunctional alcohols, such as (poly)ethyleneglycol, (poly)propyleneglycol, neopentylglycol, catechol, resorcinol, alkyleneglycol and multivalent glycydilethers, such as glyceride, trimethylolpropane, sorbitol, pentaerythrytol, bisphenol A, hydrolic bisphenol A, and the like.

Suitable polyhydroxy alcohols are bifunctional alcohols, such as (poly)ethyleneglycol, (poly)propyleneglycol, neopentylglycol, hexanediol, octyleneglycol, catechol, resorcinol, alkanediol, from trifunctional alcohols such as glycerines and trimethylolpropane and polyhydric alcohols such as polyvinylalchol, sorbitol, pentaerythritol and the like.

Suitable polycarboxylic acids include malonic acid, succinic acid, adipic acid, azelaic acid, maleic acid, ortho-phthalic acid, terephthalic acid, fumaric acid, itaconic acid, oxalacetic acid and the like.

Suitable polycarboxylic anhydrides include succinic acid anhydride, maleic acid anhydride, itaconic acid anhydride, 1,2-dimethyl maleic acid anhydride, phthalic acid anhydride, hexahydrophthalic acid anhydride, naphthalic acid anhydride and the like.

The surface hard coat also includes colloidal silica. The colloidal silica should have a particle diameter between about 1 to 100 mμ and may be chosen from commercially available colloidal solutions formed by dispersing fine grains of inorganic silicic acid in a water or alcohol dispersion medium. It is preferred that the colloidal silica has a particle diameter between about 5 and 40 mμ and that the dispersion medium is methanol, ethanol, i-propanol, n-butanol, a Cellosolve or water.

The magnesium perchlorate is added to the surface hard coat as a catalyst in order to improve hot-water resistance, dyeability, chemical resistance and weather resistance of the hard coating. In addition, shelf life of surface hard coat is increased if magnesium perchlorate is added to the hard coat.

Although other curing catalysts such as a catalyst of the silanol group and epoxy group are available, these catalysts are not fully satisfactory. For example, when an amino acid catalyst, such as glycine and an amine, such as n-butylamine, tri-ethylamine, guanidine and biganid is used the surface hard coat is not sufficiently hard.

Metal acetylacetonate catalysts, such as alminum acetylacetonate, chromeacetylacetonate, tytanylacetylacetonate and cobalt acetylacetonate yield a hard coat which is not sufficiently hard. Additionally, water-resistance is poor, hardness is lowered when exposed to hot water and shelf-life of the coating is short. Organic acid metal salts or perchloride acids, such as sodium acetate, naphthenic acid zinc, naphthenic acid cobalt, octyl acid zinc, octyl acid tin and perchloride ammonium are also not suitable since shelf-life is reduced and tinting is not uniform. If hydrochloric acid, phosphoric acid, nitric acid, or paratoluenesulfonic acid is used as a catylst, curing takes a long time. Additionally, Lewis acids, such as SnCl$_4$, AlCl$_3$, FeCl$_3$, TiCl$_4$, ZnCl$_2$, SbCl$_5$ are not suitable since they reduce water resistance and hardness of the coating.

After repeated testing of various curing catalysts in order to eliminate these drawbacks, applicant has concluded that magnesium perchlorate is the preferred catalyst. The shelf-life of a coating composition containing magnesium perchlorate is longer than one month at room temperature. Additionally, a coating formed therefrom using magnesium perchlorate has excellent abrasion resistance, hot-water resistance, chemical resistance, dyeability and weather resistance.

A surface hard coat prepared in accordance with the invention may be diluted with an appropriate solvent. Additives such as ultraviolet light absorbers, thixotropic agents, and dyes may also be added. Catalysts such as alcohols, ketones, cellosolves, carboxylic acids and mixtures thereof can be added as well. Additionally, it may be desirable to add nonionic surfactants, anionic surfactants or silicon surfactants as leveling agents, if necessary. Moreover, metal compounds, fine powders of metal oxides and metal alkoxides may also be added as desired.

In preparing a silicon resin surface hard coat in accordance with the invention, at least one of the two silicon compounds of formulas (4) and (5), at least one compound selected from the group consisting of multifunctional epoxy compounds, polyhydroxy alcohol compounds, polycarboxylic acids and polycarboxylic acid anhydrides, colloidal silica, and magnesium perchlorate are mixed together in preferred proportions.

The compounds of formulas (4) and (5) are added in an amount between about 50 to 800 parts by weight. Colloidal silica having a particle diameter between about 1 to 100 m$\mu$ is added in an amount of about 100 parts by weight. At least one compound from the group consisting of multifunctional epoxy compounds, polyhydroxy alcohols, carboxylic acids, and anhydrides of the carboxylic acids is added in an amount between about 50 to 600 parts by weight, preferably between about 100 to 500 parts by weight. Magnesium perchlorate is added in the amount between about 0.1 to 5.0 percent of the remaining solid.

In accordance with another embodiment of the invention, the surface hard coat may be formed from an acryl resin composition. The acryl resin composition includes at least one compound having at least two (metha)acryl groups and a photopolymerizing initiator. Additionally, colloidal silica having a particle diameter between about 1 to 100 mu may be added.

The acryl surface hard coat, like the silica surface hard coat, has excellent adherence to synthetic resin lenses which have been treated with an aqueous solution of polyethyleneglycol and an alkali metal hydroxide in accordance with the invention.

The acryl resin surface hard coat is superior to many surface coating compositions. Curing time is reduced and therefore surface hardness is obtained in a short period of time. Shelf-life is long and the composition may in fact remain useable up to one year if maintained in a non-lighted area at room temperature. Additionally, the composition completely reacts despite dissolution. Furthermore, manufacture requires minimal energy input thereby reducing cost.

Methods for forming acryl resin hard coating composition are disclosed in prior references including Japanese Patent 57-15608, Japanese Patent 57-43578. Various photosetting coating compositions are available commercially. An improved acryl resin hard coat in accordance with this invention is prepared by using a compound including at least two (metha)-acryl groups, collodial silica having a particle diameter between about 1 to 100 mu and a photopolymerization initiator.

The principal component is a monomer or prepolymer including at least two (metha) acryl groups. Suitable acryl compounds include di- or tri(metha)acrylate of (poly)ethylene glycol (poly)propylene glycol, hexandiol, neopentylglycol, glycerine and trimetyrolpropane; a tri, tretra or hexa(metha)acrylate of pentaeryslitol, dipentaerythrytol, and sorbitol.

In addition, spirane(metha)acrylate prepared by polymerizing unsaturated groups such as 2-hydroxyethyl(metha)acrylate or the like into unsaturated cycloacetal compounds such as diallylindepentaerythrytol or the like is an effective additive for improving coating adhesion with the lens base.

Hardness of the hard coat may be improved by increasing the concentration of compounds having multiple functional groups or using di(metha)acrylate of a multivalent alcohol prepared by adding ethylene oxide to bisphenol A or hydroquinone. In order to improve the adhesion of the hard coat a polyhydricacrylate prepared by acrylizing the reactive group in a resin such as polybutadiene may be added.

Heat resistance and chemical resistance of the surface hard coat may also be improved by adding a silicon acrylate having acryl group at the silicon oligomer terminal or a melamine acrylate initiated with methylolmelamine and 2-hydroxyethyl(metha)acrylate. Alternatively, di(metha)acrylate or polyurethane acrylate of polyester initiated with polyhydric alcohol and polybasic acid, such as phthalic acid may be also utilized. The compounds are preferably used in combination. Nevertheless, use of only one will improve heat and chemical resistance.

Reactive deluents may also be added in order to lower the viscosity of the surface hard coat composition and thereby facilitate manufacture. Suitable reactive deluents include methyl(metha)acrylate, ethyl(metha)acrylate, 2-ethylhexylacrylate, butyl(metha)acrylate, glycidyl(metha)acrylate, (metha)acrylonitrile, hydroxyethyl(metha)acrylate, hydroxypropyl(metha)acrylate, vinyl acetate, styrene, $\alpha$-methylstyrene, $\alpha$-chlorostyrene, (metha)acrylamido, vinylnaphthalene, vinylcarbazole, $\gamma$-methacryloiloxypropyltrimethyoxysilane, $\beta$-acryloiloxyethyltrimethoxysilane.

The colloidal silica is preferably included in the hard coat composition and should have a particle diameter between about 1 to 100 m$\mu$. The surface hard coat including colloidal silica has improved resistance to weather, abrasion, water and heat. Moreover, surface hard coat reflection is prevented by adding colloidal silica or depositing an inorganic substance on the hard coat layer. The collodial silica should be included whenever hardness, dyeability and chemical resistance of the hard coat is desired to be maintained at adequate levels.

The photopolymerization initiators suitable for use include benzoinethers, such as benzoin, benzoinmethylether, benzoinethylether and the like, benzophenones, acetophenones, butyroin, anthraquinone, diphenyldisulfide, benzyldimethylketals, azoisobutylnitril and so on, either singly or in combination.

The photopolymerization initiators are preferably present in an amount between about 0.1 to 5 parts by weight. If the concentration is less than 0.1 parts by weight, polymerization is not completed. If the concentration is greater than 5 parts by weight, further advantages are not observed.

A photosensitizer may be added along with a photopolymerization initiator. Suitable photosensitizers include n-butylamine, di-n-butylamine, tri-n-butylphosphineallylthio urea, diethylaminoethylmethacrylate and triethylenetetramine.

The acryl resin coating composition may be diluted with a solvent as is necessary. Suitable solvents include alcohols, esters, ketones and ethers.

It is often desirable to add a surfactant, such as a silicone surfactant, a nonionic surfactant, a thixotropic agent or a slipping agent such as silicon oil in order to improve the coating surface.

In order to control thermopolymerization, a storage stabilizer such as benzyltrimethylamnonium, benzothiazole and hydroquinone may be added.

The acryl resin composition is cured by exposure to light having a wavelength between about 220 to 400 nm for a time period between 1 second to a few minutes. A suitable light source includes a xenon lamp, a low-pressure mercury vapor lamp, a high-pressure mercury vapor lamp and a ultra-high-pressure mercury vapor lamp. Curing is performed in an atmosphere composed of air or an inactive gas.

The silicon resin on acryl resin surface hard coat compositions in accordance with the invention are coated onto the synthetic resin lens by means of dip coating, spray coating, roll coating, spin coating or flow coating. The composition is coated onto the lens to a thickness between about 1 to 30u. If the thickness of the coating is more than 30u, surface smoothness is reduced and optical distortion may occur.

The silicon and acryl resin compositions described are easily dyeable and therefore may be used as an antireflection film. If a single or multilayer film of an inorganic dielectric material is formed on the surface hard coat, interface reflection between the surface and the air is reduced. Suitable inorganic dielectric materials include $SiO$, $SiO_2$, $Si_3N$, $TiO_2$, $ZrO_2$, $Al_2O_3$ and $MgF_2$. The inorganic dielectric material is formed on the surface hard coat by means of vacuum vapor deposition. Other suitable materials include $Sb_2O_3$, $CaF_2$, $CeO_2$, $CeF_3$, $Na_3AlF_6$, $La_2F_3$, $PbF_3$, $NdF_3$, $Pr_6O_{11}$, $ThO_2$, $ThF_4$, $ZnS$, $Ge$, $PbTe$, $Tl_2O_3$, $HfO_2$, $Ta_2O_5$, $Y_2O_3$ and $Yb_2O_3$.

The resin surface hard coats of the invention have improved transparency, dyeability and a higher refractive index. Moreover, the surface hard coat may be applied to a polycarbonate lens base including a diethylenglycolbisallylcarbonate or bisphenol A polycarbonate, or an acryl resin such as polymethacrylate.

The resin hard coats may be desposited on the surfaces of a wide variety of lenses, including the lens of a camera, telescope, light-beam condenser, measuring device, transparent glass, watch-glass, a display panel, automobile and building construction material.

The lens in accordance with the invention is now described below by way of Example. Examples 1–6 describe preparation of six different synthetic resin lens bases in accordance with the invention. Examples 7–11 describe preparation of a surface treatment composition in accordance with the invention. Examples 12–34 describe the preparation of a coating composition in accordance with the composition.

Although specific compositions and method are described, the invention is not limited to what the examples recite. Additionally, the term "parts" refers to "parts by weight".

EXAMPLE 1

A synthetic resin lens was prepared using 50 parts of 2,2-bis[4-(2-allyloxycarbonyloxyethoxy)-3,5-dibromophenyl]propane, 50 parts of diallylorthophthalate and 0.1 parts of 2-(2'-hydroxy-5'-methylphenyl)benzotriazole. The ingredients were mixed and then stirred. Thereafter, 1.2 parts of diisopropylperoxydicarbonate were added as polymerization initiator. The mixture was stirred and filtered. The filtrate was injected into a glass-forming mold consisting of two glasses have specular surfaces, the inside of the glasses are encapsulated by a gasket of ethylene-vinyl acetate copolymer, and subjected to casting polymerization in an oven. At first, polymerization was carried out at 40° C. for 4 hours. The temperature was then raised to 60° C. over an 18 hour period. Thereafter, the temperature was raised to 90° C. for a additional 2 hours.

After polymerization was completed, the gasket was peeled away and the glass plates removed. The resulting lens had a specular surface, no internal distortion, and a refractive index of 1.583. A series of 49 lenses ranging from +6.00 to −6.00 diopters, respectively, were prepared in accordance with this method. The surfaces of the lens were not distorted and not partially attached to the glass mold. Accordingly, each lens had excellent optical properties.

EXAMPLE 2

A synthetic resin lens base (2) was prepared using 50 parts of 2,2-bis[4-2(-allyloxylcarbonyloxyethoxy)-3,5-dibromophenyl]propane, 42 parts of diallylisophthalate, 8 parts of diethyleneglycolbisallylcarbonate and 0.2 parts of 2-hydroxy-4-methoxybenzophenone. The ingredients were mixed and then stirred. Thereafter, 1.5 parts of di-n-propylperoxydicarbonate was added as a polymerization initiator. The mixture was then stirred and filtered. Afterwards, the filtrate was cast in the same manner as described in Example 1. The resulting lens had no optical defects and a refractive index of 1.579.

EXAMPLE 3

A synthetic resin lens base (3) was prepared as in Example 1 using 45 parts of 2,2-bis(4-allyloxycarbonyloxy-3,5-dibromophenyl)propane, 50 parts of diallylisophthalate, 5 parts of diethyleneglycolbisallylcarbonate and 0.2 part of 2(2'-hydroxy-5'-methylphenyl)benzotriazole. 1.3 parts of diisopropylperoxycarbonate were added as polymerization initiator. The resulting synthetic resin lens had a refractive index of 1.583.

EXAMPLE 4

A synthetic resin lens base (4) was prepared using 50 parts of 2,2-bis[4-(2-allyloxylcarbonyloxyethoxy)-3,5-dibromophenyl]propane, 30 parts of diallylisophthrate, 10 parts of polyethyleneglycolbis(allylcarbonate) (average molecular weight 200) and 0.2 parts of 2-hydroxy-4-methoxybenzophenon. The ingredients were mixed and then stirred. Thereafter, 1.3 parts of diisopropylperoxydicarbonate was added as a polymerization initiator. The mixture was then stirred and filtered. The filtrate was injected into a glass-forming mold of two glass plates each having a specular surface encapsulated by a gasket of ethylenevinylchloride copolymer, and subjected to casting polymerization in an oven. At first, polymerization was carried out at 40° C. for 4 hours. The temperature was then raised to 60° C. of for 18 hours. Thereafter, the temperature was raised to 90° C. for an additional 2 hours.

After polymerization was completed, the gasket was peeled off the glass plates and the lens was cured at 100° C. for 3 hours in order to reduce internal stress. The resulting lens had a refractive index of 1.58.

EXAMPLE 5

A synthetic resin lens base (5) was prepared as in Example 1 using 53 parts of 2,2-bis(4-allyloxycarbonyloxyethoxy-3,5-dibromophenyl)propane, 28 parts of diallylterephthalate, 14 parts of allyldiglycolcarbonate and 0.4 parts of 2-ethylhexyl-2-cyano-3,3-diphenylacrylate. Thereafter, 3.6 parts of di-2-diethylhexylperoxydicarbonate were added as a polymerization initiator. The resulting synthetic lens had a refractive index of 1.573.

EXAMPLE 6

A synthetic resin lens base (6) was prepared as in Example 1 using 55 parts of 2,2-bis[4-(2-allyloxycarbonyloxyethoxy)-4,6-dibromophenyl]propane, 27 parts of diallylorthophthalate, 9 parts of allyldiglycolcarbonate, 9 parts of polyethyleneglycolbis(allylcarbonate) (average molecular weight 200) and 0.2 parts of 2(2'-hydroxy-5'-methylphenyl)benzotriazole. 1 part of diisopropylperoxydicarbonate was added as a polymerization initiator. The resulting synthetic lens had a refractive index of 1.574.

The following Examples 7–11 illustrate five different lens surface treating solutions in accordance with the invention. Each solution was used to treat the lens bases prepared in Examples 1–6. The specific lens base and the specific surface treatment applied is shown in TABLE 1 below.

EXAMPLE 7

Surface treatment (7) solution was formed by dissolving 100 parts of 400 molecular weight polyethyleneglycol in 850 g of hot water at 40° C. and adding 50 g of sodium hydroxide. The resulting solution was maintained at a temperature of 45° C. Thereafter, the lenses were dipped into the solution for 5 minutes in order to treat the surface of the lens sufficiently.

By treating a lens in this manner, lens wet-out to pure water was improved. As a result, the contact angle was reduced from between 80 to 90 before treatment to between 35 to 40 after treatment. Hence, surface tension was increased.

EXAMPLE 8

Surface treating solution (8) was prepared in a 2 liter vessel by dissolving 50 parts of polyethyleneglycol #400 (molecular weight 400) and 20 parts of polyethyleneglycol #1000 (molecular weight 1000) (both produced by Japan Fatts & Fatty Oil Co., Ltd.) in 800 g of hot water at 40° C. and adding 100 parts of potassium hydroxide while stirring. The resulting solution was maintained at a temperature of 45° C. Thereafter, the lens bases were dipped in the solution for 3 minutes in order to sufficiently treat the surface of the lens.

EXAMPLE 9

Surface treating solution (9) was prepared by dissolving 20 parts of polyethyleneglycol (molecular weight 200) in pure water and adding five parts of sodium hydroxide. The resulting solution was maintained at temperature of 32° C.±2° C. Thereafter, the lens bases identified in TABLE 1 were dipped in the solution for about 5 minutes to treat the surface of the lenses. The lenses were then washed with pure water and dipped into a 0.5 normal hydrochloric acid aqueous solution having a temperature of 30° C. for about 5 minutes. The lens was washed again with water and then dried.

EXAMPLE 10

Surface treatment solution (10) was prepared by dissolving 10 parts of sodium hydroxide and 0.1 parts of polyoxyethylenenonylphenylether of a nonionic surfactant ("Nonion NS-206" produced by Japan Fatts & Fatty Oil Co., Ltd.) in pure water to yield 100 parts by weight total. The resulting solution was maintained at a temperature of 32° C.±2° C. Thereafter, lens bases identified in TABLE 1 which had been previously treated were dipped in the solution for about 3 minutes to treat the surface of the lens. The lens bases were washed with pure water and dipped into 0.5 normal hydrochloric acid aqueous solution at a temperature of about 30° C. for about 3 minutes. The lens was washed again with pure water and dried.

EXAMPLE 11

Surface treatment solution (11) was prepared by dissolving 20 parts of polyethyleneglycol (400 molecular weight) and 0.1 part of sodium dedecylbenzene sulphonic acid ("New Rex Powder F" produced by Japan Fatts and Fatty Oil Co., Ltd.) and 5 parts of sodium hydroxide in pure water. The resulting solution was maintained at a temperature of 32° C.±2° C. Thereafter the lenses identified in TABLE 1 were dipped into the solution for about 3 minutes to treat the surface of the lens. The lens were then washed with pure water and dipped into 0.1 normal sulfuricacid solution having a temperature of about 30° C. for about 3 minutes. The the lens was washed again with pure water and dried.

EXAMPLE 12

A synthetic resin lens surface hard coat composition (12) was prepared making a solution of 230 parts of isopropanol dispersed colloidal silica ("OSCAL-1432" produced by Catalysts Chemical Formation Co., Ltd., solid content concentration 30%), 220 parts of isopropanol and 108 parts of γ-glycidoxypropyltrimethoxysilane in a nitrogen atmosphere under stirring. 52 parts of 0.05 normal hydrochloric acid were added drop-wise over 30 minutes and 0.1 parts of fluoride surfactant were added. The resulting composition was left to stand for 24 hours at 20° C. before use.

EXAMPLE 13

A synthetic resin lens surface hard coat composition (13) was prepared from a solution of 249 parts of γ-glycidoxypropyltrimethoxysilane, 126 parts of colloidal silica ("Methanol Silica Sol" produced by Nissan Chemical Co., Ltd., solid content concentration 30%) and 464 parts of methylcellosolve to hydrolyze the silane compounds. 68 parts of 0.05N hydrochloric acid were added drop-wise to the solution. The resulting composition was left to stand for 24 hours at 0° C. Then, 86 parts of glycerindiglycidylether ("Denacor EX313" produced by Nagase Sangyo Co., Ltd.), 7 parts of magnesium perchlorate and 0.1 part of silicon surfactant ("L-7604" produced by Japan Unicar Co., Ltd.) were added in order to form the coating composition.

EXAMPLE 14

A synthetic resin lens surface hard coat composition (14) was prepared by making a solution of 110 parts of methyltrimethoxysilane, 11 parts of 3-mercaptopropyltrimethoxysilane, 10 parts of the compound represented by the general formula:

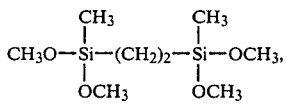

250 parts of "Methanol Silica Sol" of Example 5 and 180 parts of isopropanol to hydrolyze the silica compounds. 60 parts of 0.05N hydrochrolic acid were added drop-wise. After mixing, the resulting composition was left to stand for 24 hours at 0° C. Then 95 parts of diethyleneglycol, 3 parts of magnesium perchlorate and 0.1 part of a flow control agent "L-7604" were added at room temperature in order to form the coating composition.

EXAMPLE 15

A photosetting synthetic resin lens surface hard coat composition (15) was prepared by dissolving 30 parts of pentaerythrytoltetraacrylate, 20 parts of trimethylolpropanetriacrylate, 30 parts of diethyleneglycoldiacrylate and 5.3 parts of ethanol dispersed colloidal silica ("OSCAL 1232" produced by Catalysts Chemical Formation Co., Ltd., solid content concentration 30%). 3 parts of tetrahydrofurfrylacrylate and 50 parts of ethyl acetate. Then, 1.8 parts of benzoinmethylether and 0.02 part of silicon surfactant ("Y-7002" produced by Japan Unicar Co., Ltd.) were also added in order to form the coating composition.

EXAMPLE 16

A photosetting synthetic resin lens surface hard coat composition (16) was prepared adding 30 parts of an acrylate ester of diallylydenpentaerythritol ("Spirack T-500" produced by Showa Macromole Co., Ltd.), 10 parts of hexanedioldimethacrylate and 50 parts of butyl acetate to a mixture of 25 parts of dipentaerythrytolhexaacrylate, 25 parts of pentaerysrytolacrylate, 5 parts of tetrahydrofulfrylacrylate, and 0.3 part of nonionic surfactant ("Nissan Nonion Lt-220" produced by Japan Fatts & Fatty Oil Co, Ltd.) while stirring to yield the coating composition.

EXAMPLE 17

A synthetic resin lens surface hard coat solution was prepared by mixing 108 parts of methyltrimethoxysilane, 212 parts of isopropanol dispersed colloidal silica ("OSCAL-1432" produced by Shokubai-Kasei Co., Ltd. solid content concentration is 30%) in 437 parts of isopropanol and adding 52 parts of 0.05N hydrochloric acid drop-wise to the solution. The resulting composition was left to stand for 24 hours at 0° C. Then, 183 parts of 1,6-hexandioldiglycidylether ("Epolite 1600" produced by Kyoeisha Fatts & Fatty Oil Co., Ltd.) and 5 parts of magnesium perchlorate were added at room temperature to make the composition uniform. A few drops of a flow-control agent ("L-7604" by Nippon Unicar Co., Ltd.) were added to form the coating composition.

EXAMPLE 18

A synthetic resin lens surface hard coat composition was prepared by mixing 111 parts of methyltrimethoxy silane, 271 parts of methanol dispersed colloidal silica ("OSCAL-1132" produced by Catalysts Chemical Formation Co., Ltd. solid content concentration 30%) and 395 parts of isopropanol and adding 53 parts of 0.05N hydrochloric acid in order to hydrolyze the silane. The resulting composition was left to stand for 24 hours at 0° C. Then, 164 parts of trimethylol propanetriglycidylether ("Epolite 100MF" produced by Khoeisha Fatts & Fatty Oil Co., Ltd.) and 5 parts of magnesium perchlorate were added. A few drops of a flow control agent "L-7604" were also added as an adjuster in order to form the coating composition.

EXAMPLE 19

A synthetic resin lens surface hard coat composition was prepared by mixing 79 parts of dimethylmethoxy silane, 175 parts of isopropanol dispersed colloidal silica ("OSCAL-1432" produced by Catalyst Chemical Formation Co., Ltd., solid content concentration 30%) and 512 parts of isopropanol and adding 28 parts of 0.05N hydrochloric acid drop-wise in order to hydrolyze the silane compounds. The resulting solution was left to stand for 24 hours at 0° C. Then, 199 parts of trimethylol propanetriglycidylether ("Epolite 100MF" produced by Kyoeisha Fatts & Fatty Oil Co., Ltd.) and 7 grams of magnesium perchlorate were added. A few drops of a flow control agent "L-7604" were added as an adjuster in order to form the coating composition.

EXAMPLE 20

A synthetic resin lens surface hard coat composition was prepared by mixing 207 parts of γ-glycidoxypropyltrimethoxy silane, 263 parts of aqueous dispersed collidal silica ("Snowtex C" produced by Nissan Chemical Co., Ltd., solid content concentration 20%) and 366 parts of methylcellosolve and adding 57 parts of 0.05N hydrochloric acid drop-wise in order to hydrolyze the silane compound. 101 parts of 1,6 hexanediolglycidylether ("Epolite 1600" produced by Kyoei Fatts & Fatty Oil, Ltd.) and 6 parts of magnesium perchlorate were added and a few drops of a flow control agent "L-7604" were added as adjuster in order to form the coating composition.

EXAMPLE 21

A synthetic resin lens surface hard coat composition was prepared by mixing 249 parts of γ-glycidoxypropyl-trimethoxy silane, 126 parts of colloidal silica ("Methanole Silica Sol" produced by Nissan Chemical Co., Ltd., solid content concentration 30%) and 464 parts of methylcellosolve and adding 68 parts of 0.05N hydrochloric acid drop-wise in order to hydrolyze the silane compounds. The resulting solution was left to stand for 24 hours at 0° C. and 86 parts of glycerdiglycidylether ("Denacol EX313" produced by Nagase Sangyo Co., Ltd.) and 7 parts of magnesium perchlorate were added. A few drops of flow control agent "L-7604" were added as an adjuster in order to form the coating composition.

EXAMPLE 22

A synthetic resin lens surface hard coat composition was prepared by mixing 219 parts of γ-glycidoxypropyltrimethoxy silane, 111 parts of isopropanol dispersed colloidal silica ("OSCAL-1432" produced by Catalysts Chemical Formation Co., Ltd., solid content concentration 30%) and 491 parts of isopropanol and adding 60 parts of 0.05N hydrochloric acid drop-wise in order to hydrolyze the silane compounds. The resulting solution was left to stand for 24 hours at 0° and 112 parts of propyleneglycoldiglycidylether ("Denacol EX911" produced by Nagase Sangyo Co., Ltd.) and 7 parts of magnesium perchlorate were added. A few drops of flow control agent "L-7604" were added as an adjuster in order to form the coating composition.

EXAMPLE 23

A synthetic resin lens surface hard coat composition was prepared by mixing 174 parts of γ-glycidoxypropylmethyldiethoxy silane, 351 parts of water dispersed colloidal silica ("Cataloid SN" produced by Catalysts Chemical Formation Co., Ltd., solid content concentration 20%) and 331 parts of methylcellosolve and adding 30 parts of 0.05N hydrochloric acid drop-wise in order to hydrolyze the silane compound. The resulting solution was left to stand for 24 hours at 0° C. and 108 parts of propyleneglycoldiglycidylether ("Denacol EX911") and 6 parts of magnsium perchlorate were added. A few drops of flow control agent "L-7604" were added as an adjuster in order to form the coating composition.

EXAMPLE 24

A synthetic resin lens surface hard coat composition was prepared by mixing 133 parts of β-(3,4-epoxycychlohexyl)ethyltrimethoxy silane, 215 parts of colloidal silica ("Methanole Silica Sol" produced by Nissan Chemical Kogyo Co., Ltd. solid content concentration 30%) and 470 parts of isopropanol and adding 35 parts of 0.05 hydrochloric acid drop-wise in order to hydrolyze the silane compound. The resulting solution was left to stand for 24 hours at 0° C. and 140 parts of glycerictriglycidylether ("Denacol EX314" produced by Nagase Sangyo Co., Ltd.) and 7 parts of magnesium perchlorate were added. A few drops of flow control agent "L-7604" was added as an adjuster in order to form the coating composition.

EXAMPLE 25

A synthetic resin lens surface hard coat composition was prepared by mixing 305 parts of γ-glycidoxypropyltrimethoxy silane, 155 parts of aqueous dispersed colloidal silica ("OSCAL-1432" produced by Catalysts Chemical Formation Co., Ltd., solid content concentration 30%) and 406 parts of isopropanol and adding 84 parts of 0.05N hydrochloric acid drop-wise. The resulting solution was left to stand for 24 hours at 0° C. and 47 parts of of 1,4-butandiol and 3 parts of magnesium perchlorate were added at room temperature. 0.3 part of flow control agent "L-7604" was also added as an adjuster in order to form the coating composition.

EXAMPLE 26

A synthetic resin lens surface hard coat composition was prepared by mixing 242 parts of γ-glycidoxypropyltrimethoxy silane, 205 parts of methanol dispersed colloidal silica ("Methanole Silica Sol" produced by Nissan Chemical Co., Ltd., solid content concentration 30%), 408 parts of isopropanol and adding 66 parts of 0.05N hydrochloric acid drop-wise in order to hydrolyze the silane compound. After further stirring at room temperature for 2 hours, the resulting solution was left to stand for 24 hours at 0° C. and 77 parts of triethyleneglycol and 3 parts of magnesium perchlorate were added at room temperature. 0.3 part of flow control agent "L-7604" was added as an adjuster in order to form the coating composition.

EXAMPLE 27

A synthetic resin lens surface hard coat composition was prepared by mixing 220 parts of γ-glycidoxypropylmethyldiethoxy silane, 400 parts of water dispersed colloidal silica ("Snowtex C" produced by Nissan Chemical Kogyo Co., Ltd., solid content concentration 20%) and 261 parts of methylcellosolve and adding 30 parts of 0.05N hydrochloric acid drop-wise in order to hydrolyze the silane compounds. After further stirring at room temperature for 2 hours, the resulting solution was left to stand for 24 hours at 0° C. and then 79 parts of diethyleneglycol and 3 parts of magnesium perchlorate were added at room temperature. 0.3 part of flow control agent "L-7604" was added as an adjuster in order to form the coating composition.

EXAMPLE 28

A synthetic resin lens coating composition was prepared by mixing 163 parts of β-(3,4-epoxycyclohexyl)ethyltrimethoxy silane, 547 parts of water dispersed colloidal silica ("Cataloid SN" produced by Catalysts Chemical Formation Co., Ltd., solid content concentration 20%) and 158 parts of methylcellosolve and adding 43 parts of 0.05N hydrochloric acid drop-wise in order to hydrolyze the silane compounds. After stirring at room temperature for about 2 hours, the resulting solution was left to stand for 24 hours at 0° C. and 88 parts of diethyleneglycol and 3 parts of magnesium perchlorate were added. 0.3 part of flow control agent "L-7604" was added as an adjuster in order to form the coating composition.

EXAMPLE 29

A synthetic resin lens surface hard coat composition was prepared by mixing 234 parts of γ-glycidoxypropylmethyldiethoxy silane, 283 parts of methanol dispersed colloidal silica ("Methanol Silica Sol" produced by Nissan Chemical Co., Ltd., solid content concentration 30%) and 368 parts of isopropanol and adding 41 parts of 0.05N hydrochloric acid drop-wise in order to hydrolyze the silane compounds. After stirring at room temperature for 2 hours, the resulting solution was left to stand for 24 hours at 0° C. and 72 parts of glycerol and 3 parts of magnesium perchlorate were added at room temperature. 0.3 parts of flow control agent "L-7604" was added as an adjuster in order to form the coating composition.

EXAMPLE 30

A synthetic resin lens surface hard coat composition was prepared by mixing 223 parts of methyltrimethoxy silane, 328 parts of isopropanol dispersed colloidal silica ("OSCAL-1432") and 212 parts of isopropanol and adding 106 parts of 0.05N hydrochloric acid drop-wise in order to hydrolyze the silane compounds. After further stirring at room temperature for 2 hours, the resulting solution was left to stand for 24 hours at 0° C. and 130 parts of glycerol and 3 parts of magnesium perchlorate were added at room temperature. 0.3 part of flow control agent "L-7604" was added as an adjuster in order to form the coating composition.

EXAMPLE 31

A synthetic resin lens surface hard coat composition was prepared by mixing 227 parts of γ-glycydoxypropyltrimethoxy silane, 288 parts of water dispersed colloidal silica (Snowtex C) and 330 parts of methylcellosolve and adding 62 parts of 0.05N hydrochloric acid drop-wise in order to hydrolyze the silane compound. After stirring at room temperature for 2 hours, the resulting solution was left to stand for 24 hours at 0° C. and 90 parts of azelaic acid and 3 parts of magnesium perchlorate were added at room temperature. 0.3 parts of flow control agent "L-7604" was added as an adjuster in order to form the coating composition.

EXAMPLE 32

A synthetic resin lens surface hard coat composition was prepared by mixing 189 parts of β-(3,4-epoxycyclohexyl)ethyltrimethoxy silane, 384 parts of water dispersed colloidal silica (Snowtex C) and 297 parts of ethylcellosolve and adding 50 parts of 0.5N hydrochloric acid drop-wise in order to hydrolyze the silane compound. After stirring at room temperature for 2 hours, the resulting solution was left to stand for 24 hours at 0° C. and 96 parts of trimellitic anhydride and 3 parts of magnesium perchlorate were added at room temperature. 0.3 part of flow control agent "L-7604" was added as an adjuster in order to form the coating composition.

EXAMPLE 33

A synthetic resin lens surface hard coat composition was prepared by mixing 276 parts of γ-glycidoxypropylmethyldiethoxy silane, 134 parts of methanol dispersed colloidal silica (OSCAL-1132) and 465 parts of ethylcellosolve and adding 48 parts of 0.05N hydrochloric acid drop-wise in order to hydrolyze the silane compounds. After further stirring at room temperature for 2 hours, the resulting solution was left to stand for 24 hours at 0° C. and 74 parts of terephthalic acid and 3 parts of magnesium perchlorate were added at room temperature. 0.3 parts of flow control agent "L-7604" was also added as adjuster in order to form the coating composition.

EXAMPLE 34

A synthetic resin lens surface hard coat composition was prepared by mixing 162 parts of methyltrimethoxy silane, 396 parts of methanol dispersed colloidal silica ("Methanol Silica Sol") and 249 parts of methylcellosolve and adding 77 parts of 0.05N hydrochloric acid drop-wise in order to hydrolyze the silane compound. After further stirring at room temperature for 2 hours, the resulting solution was left to stand for 24 hours at 0° C. and 116 parts of adipic acid and 3 parts of perchlorate were added at room temperature. 0.3 part of flow control agent "L-7604" were added as an adjuster in order to form the coating composition.

In accordance with the invention, a lens is dipped into the desired surface hard coat composition prepared in Examples 12-34 and coated at a lifting speed of 20 cm/min. The lens is then air dried for about 10 minutes and cured in a hot-air oven at 80° C. for 1 hour and 130° C. for a second hour. When the photosetting coating compositions of Examples 15 and 16 are applied, the lens is heated at 40° C. for an additional 10 minutes. Then both surfaces of the lens are placed 10 cm beneath an ultraviolet light source for 30 seconds each. A suitable light source is a high pressure mercury vapor lamp of 4 KW, 160 W/cm.

Table I below describes the various synthetic resin lens bases of Examples 1-6 coated with the surface hard coat of Examples 12-34 after surface treatment in a manner described in Examples 7-11. For each coated lens described, reference is made to the specific lens base, surface treatment, and hard coat composition as described in the Examples.

TABLE 1

| LENS EXAMPLE NO. | SURFACE TREATMENT EXAMPLE NO. | COATING EXAMPLE NO. | EMBODIMENT |
|---|---|---|---|
| 1 | 7 | 12 | 1 |
| 1 | 7 | 13 | 2 |
| 2 | 7 | 14 | 3 |
| 2 | 7 | 15 | 4 |
| 3 | 7 | 16 | 5 |
| 1 | 8 | 12 | 6 |
| 2 | 8 | 13 | 7 |
| 3 | 8 | 15 | 8 |
| 2 | 7 | Diabeam | 9 |
| 4 | 9 | 17 | 10 |
| 4 | 9 | 26 | 11 |
| 4 | 9 | 23 | 12 |
| 4 | 9 | 32 | 13 |
| 4 | 10 | 18 | 14 |
| 4 | 10 | 27 | 15 |
| 4 | 10 | 24 | 16 |
| 4 | 10 | 33 | 17 |
| 4 | 11 | 19 | 18 |
| 4 | 11 | 28 | 19 |
| 4 | 11 | 25 | 20 |
| 4 | 11 | 34 | 21 |
| 5 | 9 | 20 | 22 |
| 5 | 9 | 29 | 23 |
| 5 | 9 | 17 | 24 |
| 5 | 9 | 26 | 25 |
| 5 | 10 | 21 | 26 |
| 5 | 10 | 30 | 27 |
| 5 | 10 | 18 | 28 |
| 5 | 10 | 27 | 29 |
| 5 | 11 | 22 | 30 |
| 5 | 11 | 31 | 31 |
| 5 | 11 | 19 | 32 |
| 5 | 11 | 28 | 33 |
| 6 | 9 | 23 | 34 |
| 6 | 9 | 32 | 35 |
| 6 | 9 | 20 | 36 |
| 6 | 9 | 29 | 37 |
| 6 | 10 | 24 | 38 |
| 6 | 10 | 33 | 39 |
| 6 | 10 | 21 | 40 |
| 6 | 10 | 30 | 41 |
| 6 | 11 | 25 | 42 |
| 6 | 11 | 34 | 43 |
| 6 | 11 | 22 | 44 |
| 6 | 11 | 31 | 45 |

Table 2 sets forth for purposes of comparison various synthetic resin lenses coated in a manner not in accordance with the invention. Embodiments 46-48 were prepared without treating the lens surface before applying a surface hard coat composition. Embodiment 49 was prepared using the surface treatment of Example 9 without the addition of polyethelyneglycol. Embodiment 50 was prepared using the surface treatment of Example 10 without the addition of polyoxyethylenenonylphenylether.

Embodiment 51 was prepared using a special coating composition of 76.3 parts of isopropylalcohol, 98.8 parts of γ-glycidoxypropyltrimethoxy silane and 28.4 parts of a dimethyldimethoxysilane and 46.6 parts of 0.1 normal hydrochloric acid in order to hydrolize the silane compound. The resulting solution was left to stand for 24 hours at room temperature and 88.4 parts of ethylcellosolve and 0.42 parts of ammonium perchlorate were added to 240 parts of the solution with a flow control agent as an adjuster in order to form the coating composition. The coating composition was then applied to a lens as previously described.

Embodiment 52 was prepared using the surface hard coat composition of Example 17, except that aluminumacetyl acetonate was used in place of magnesium perchlorate.

TABLE 2

| LENS EXAMPLE NO. | SURFACE TREATMENT EXAMPLE NO. | COATING EXAMPLE NO. | EMBODIMENT |
|---|---|---|---|
| 1 | — | 12 | 46 |
| 2 | — | 13 | 47 |
| 3 | — | 16 | 48 |
| 4 | special | 17 | 49 |
| 5 | special | 17 | 50 |
| 4 | 9 | special | 51 |
| 4 | 9 | special | 52 |

For each of embodiments 1–9 and 46–48, various physical properties were examined. Specifically, (a) abrasion resistance, (b) water and chemical resistance, (c) acid and detergent resistance, (d) weather resistance, (e) adhesion, (f) hot water resistance, (g) heat resistance (cooling-heating cycle resistance), (h) impact resistance, (i) dyeability, and (j) durability were examined. The results of these tests are set forth in Table 3.

TABLE 3

| Embodiment No. | Result of Physical Properties Tests | | | | | | | | | |
|---|---|---|---|---|---|---|---|---|---|---|
| | (a) | (b) | (c) | (d) | (e) | (f) | (g) | (h) | (i) | (j) |
| 1 | A | O | O | O | 100 | A | O | O | 5 | O |
| 2 | B | O | O | O | 100 | B | O | O | 40 | O |
| 3 | B | O | O | O | 100 | B | O | O | 35 | O |
| 4 | A | O | O | O | 100 | A | O | O | 5 | O |
| 5 | B | O | O | O | 100 | B | O | O | 20 | O |
| 6 | A | O | O | O | 100 | B | O | O | 5 | O |
| 7 | B | O | O | O | 100 | B | O | O | 40 | O |
| 8 | B | O | O | O | 100 | B | O | O | 5 | O |
| 9 | A | O | O | O | 100 | A | O | O | 5 | O |
| 46 | A | O | O | O | 0 | Peel | O | O | 5 | X |
| 47 | B | Peel | O | O | 0 | D | O | O | 30 | X |
| 48 | B | Peel | O | O | 50 | D | O | O | 10 | X |

In TABLE 2, O means "good".

(a) Abrasion Resistance

In order to examine abrasion resistance, the lens prepared in each embodiment was rubbed ten times in a back and forth motion with 0000 gauge steel wool having an area of approximately 1 cm under a force of about 1 kilogram. Thereafter, the condition of the lens was examined without any optical aid and was classified into five graded categories A–E depending on the number of scratches or scars on the lens surface after steel wool rubbing.

A—exhibited no scratches or scars within a surface area of three cm. squared.

B—exhibited between 1 and 10 scratches or scars within a surface area of three cm. squared.

C—exhibited between 10 and 100 scratches or scars within a surface area of three cm. squared.

D—exhibited numerous scratches or scars; however, some parts of the lens surface remained smooth.

E—exhibited numerous scratches which were more than superficial; none of the surface remained smooth.

(b) Water and Chemical Resistance

In order to examine water and chemical resistance, the lens prepared in each embodiment was dipped into a mixture of water, alcohol, and kerosene for a time period of about 48 hours. Thereafter, the surface was examined in order to determine if any damage occurred.

(c) Acid Resistance and Detergent Resistance

In order to examine acid and detergent resistance, the lens prepared in each embodiment was dipped into 0.1N hydrochloric acid and a 1.0% aqueous solution of "MAMA-lemon" (produced by Lion Co., Ltd.) for a time period of about 12 hours. Thereafter, the surface was examined in order to see if any damage occurred.

(d) Weather Resistance

In order to examine weather resistance, the lens of each embodiment was exposed to a xenon long-life lamp of a fademeter (produced by Suga Experimental Instrument Co., Ltd.) for a time period of about 400 hours and then examined.

(e) Adhesion

In order to examine the adhesion between the lens bases and the surface hard coat, each lens was examined by the cross-cut tape method according to JIS-0202. In this test, the surface of the lens was cut with a knife into a grid having about 100 squares of approximately 1 sq. mm. An adhesive cellophane tape ("Cellotape" made by Nichiban Co., Ltd.) was pressed firmly onto the surface and removed by pulling up at right angles. Thereafter, the number of squares where coating remained was counted and used as the criteria for adhesion evaluation.

(f) Hot-Water Resistance

In order to examine hot-water resistance, the lens of each embodiment was dipped into boiling water for about 1 hour. Thereafter, abrasion resistance and adhesion were examined in the manner previously discussed.

(g) Heat Resistance (Cooling-Heating Cycle Resistance)

In order to examine heat resistance, each embodiment was held under hot air at about 70° C. for a period of 1 hour and then examined. Thereafter, a cooling and heating cycle of −5° C./15 minutes to 60° C./15 minutes was repeated five time and again the lens was examined. The cross-cut tape test described previously was also performed. If the hard coat remained normal, the embodiment was evaluated as "good".

(h) Impact Resistance

In order to examine impact resistance, a steel ball weighing about 16.4 g was dropped on the center of each lens from a height of about 127 cm and was examined to see if any cracks formed. If the appearance of the lens did not change after this test was performed three times, the lens was evaluated as "good". Each embodiment tested had a thickness of about 2 mm.

(i) Dyeability

In order to examine dyeability, each lens was dipped into a solution of a grey dye (produced by BPI) in 950 ml of pure water for 5 minutes and removed and dried. The light transmittance of each lens was then examined.

(j) Durability

In order to examine durability, tests (a)–(f) were carried out on a lens and then tests (a) and (e) were repeated. Thereafter, each lens was examined to evaluate whether deterioration occurred. If little deterioration was observed, the embodiment was evaluated as "good".

Reference is now made to Table 4 which describes the physical properties of the lenses prepared in accordance with embodiments 10–45 and 49–52. The specific characteristics that were examined include abrasion resistance, adhesion, hot-water resistance, light transmittance, dyeability and weather resistance. For each physical characteristic, the tests were conducted in the same manner as those reported in Table 3.

The physical properties of the lenses prepared in Embodiments 10–45 and 49–52 were also examined 30 days after the coating composition was applied to the lens. The physical properties examined were the same as those reported in Table 4 and the results are set forth in Table 5 below.

TABLE 4

| | (The first day after composition) | | | | | | |
|---|---|---|---|---|---|---|---|
| | Abrasion Resistance | Adhesion | After Hot-Water Resistance Abrasion Resistance | Adhesion | Light Transmittance (%) | Dyeability (Transmittance of 510 nm light) | Weather Resistance |
| Embodiment 10 | B | 100 | B | 100 | 90 | 40 | no change |
| Embodiment 11 | B | 100 | B | 100 | 90 | 40 | " |
| Embodiment 12 | B | 100 | B | 100 | 90 | 43 | " |
| Embodiment 13 | A | 100 | B | 100 | 90 | 42 | " |
| Embodiment 14 | B | 100 | B | 100 | 90 | 47 | " |
| Embodiment 15 | B | 100 | B | 100 | 90 | 51 | " |
| Embodiment 16 | B | 100 | C | 100 | 90 | 34 | " |
| Embodiment 17 | B | 100 | C | 100 | 90 | 33 | " |
| Embodiment 18 | B | 100 | C | 100 | 90 | 36 | " |
| Embodiment 19 | B | 100 | B | 100 | 90 | 47 | " |
| Embodiment 20 | B | 100 | B | 100 | 90 | 48 | " |
| Embodiment 21 | B | 100 | B | 100 | 90 | 35 | " |
| Embodiment 22 | A | 100 | B | 100 | 91 | 58 | " |
| Embodiment 23 | B | 100 | C | 100 | 91 | 35 | " |
| Embodiment 24 | B | 100 | B | 100 | 91 | 40 | " |
| Embodiment 25 | B | 100 | B | 100 | 91 | 40 | " |
| Embodiment 26 | B | 100 | B | 100 | 91 | 41 | " |
| Embodiment 27 | A | 100 | B | 100 | 91 | 55 | " |
| Embodiment 28 | B | 100 | B | 100 | 91 | 47 | " |
| Embodiment 29 | B | 100 | B | 100 | 91 | 51 | " |
| Embodiment 30 | B | 100 | B | 100 | 91 | 42 | " |
| Embodiment 31 | B | 100 | B | 100 | 91 | 46 | " |
| Embodiment 32 | B | 100 | C | 100 | 91 | 36 | " |
| Embodiment 33 | B | 100 | B | 100 | 91 | 47 | " |
| Embodiment 34 | B | 100 | B | 100 | 91 | 43 | " |
| Embodiment 35 | B | 100 | B | 100 | 91 | 42 | " |
| Embodiment 36 | A | 100 | B | 100 | 91 | 58 | " |
| Embodiment 37 | B | 100 | C | 100 | 91 | 35 | " |
| Embodiment 38 | B | 100 | C | 100 | 91 | 34 | " |
| Embodiment 39 | B | 100 | C | 100 | 91 | 33 | " |
| Embodiment 40 | B | 100 | B | 100 | 91 | 41 | " |
| Embodiment 41 | A | 100 | B | 100 | 91 | 55 | " |
| Embodiment 42 | B | 100 | B | 100 | 91 | 48 | " |
| Embodiment 43 | B | 100 | B | 100 | 91 | 35 | " |
| Embodiment 44 | B | 100 | B | 100 | 91 | 42 | " |
| Embodiment 45 | B | 100 | B | 100 | 91 | 46 | " |
| Embodiment 49 | B | 0 | B | 0 | 90 | 40 | " |
| Embodiment 50 | B | 0 | B | 0 | 90 | 40 | " |
| Embodiment 51 | B | 100 | C | 100 | 92 | 78 | " |
| Embodiment 52 | B | 100 | E | 100 | 92 | 62 | " |

TABLE 5

| | (The 30th day after composition) | | | | | | |
|---|---|---|---|---|---|---|---|
| | Abrasion Resistance | Adhesion | After Hot-Water Resistance Abrasion Resistance | Adhesion | Light Transmittance (%) | Dyeability (Transmittance of 510 nm light) | Weather Resistance |
| Embodiment 10 | B | 100 | B | 100 | 90 | 40 | no change |
| Embodiment 11 | B | 100 | B | 100 | 90 | 40 | " |
| Embodiment 12 | B | 100 | B | 100 | 90 | 43 | " |
| Embodiment 13 | A | 100 | B | 100 | 90 | 42 | " |
| Embodiment 14 | B | 100 | B | 100 | 90 | 47 | " |
| Embodiment 15 | B | 100 | B | 100 | 90 | 51 | " |
| Embodiment 16 | B | 100 | B | 100 | 90 | 34 | " |
| Embodiment 17 | B | 100 | B | 100 | 90 | 33 | " |
| Embodiment 18 | B | 100 | C | 100 | 90 | 36 | " |
| Embodiment 19 | B | 100 | B | 100 | 90 | 47 | " |
| Embodiment 20 | B | 100 | B | 100 | 90 | 48 | " |
| Embodiment 21 | B | 100 | B | 100 | 90 | 35 | " |
| Embodiment 22 | A | 100 | B | 100 | 91 | 58 | " |
| Embodiment 23 | B | 100 | C | 100 | 91 | 35 | " |
| Embodiment 24 | B | 100 | B | 100 | 91 | 40 | " |

TABLE 5-continued (The 30th day after composition)

| | Abrasion Resistance | Adhesion | After Hot-Water Resistance Abrasion Resistance | Adhesion | Light Transmittance (%) | Dyeability (Transmittance of 510 nm light) | Weather Resistance |
|---|---|---|---|---|---|---|---|
| Embodiment 25 | B | 100 | B | 100 | 91 | 40 | " |
| Embodiment 26 | B | 100 | B | 100 | 91 | 41 | " |
| Embodiment 27 | A | 100 | A | 100 | 91 | 55 | " |
| Embodiment 28 | B | 100 | B | 100 | 91 | 47 | " |
| Embodiment 29 | B | 100 | B | 100 | 91 | 51 | " |
| Embodiment 30 | B | 100 | B | 100 | 91 | 42 | " |
| Embodiment 31 | B | 100 | B | 100 | 91 | 46 | " |
| Embodiment 32 | B | 100 | C | 100 | 91 | 36 | " |
| Embodiment 33 | B | 100 | B | 100 | 91 | 47 | " |
| Embodiment 34 | B | 100 | B | 100 | 91 | 43 | " |
| Embodiment 35 | B | 100 | B | 100 | 91 | 42 | " |
| Embodiment 36 | A | 100 | B | 100 | 91 | 58 | " |
| Embodiment 37 | B | 100 | B | 100 | 91 | 35 | " |
| Embodiment 38 | B | 100 | B | 100 | 91 | 34 | " |
| Embodiment 39 | B | 100 | B | 100 | 91 | 33 | " |
| Embodiment 40 | B | 100 | B | 100 | 91 | 41 | " |
| Embodiment 41 | A | 100 | A | 100 | 91 | 55 | " |
| Embodiment 42 | B | 100 | B | 100 | 91 | 48 | " |
| Embodiment 43 | B | 100 | B | 100 | 91 | 35 | " |
| Embodiment 44 | B | 100 | B | 100 | 91 | 42 | " |
| Embodiment 45 | B | 100 | B | 100 | 91 | 46 | " |
| Embodiment 49 | B | 0 | B | 0 | 90 | 40 | " |
| Embodiment 50 | B | 0 | B | 0 | 90 | 40 | " |
| Embodiment 51 | A | 100 | C | 100 | 92 | 85 | " |
| Embodiment 52 | E | 100 | E | 100 | 92 | 21 | " |

A synthetic resin lens prepared in accordance with the invention has a high refractive index and has improved abrasion resistance, heat resistance, hot-water resistance, chemical resistance, weather resistance, antistatic properties and adhesion with a tintable coating than available synthetic resin lenses. These improved properties remain despite harsh conditions or unexpected use. It is believed that the improved properties are the result of treating the lens with the anions formed by dissociating polyethyleneglycol in an aqueous alkaline solution.

Moreover, the resin material used in preparing the synthetic resin lens is advantageous since it has a refractive index which can be easily controlled by varying the mixing rate of the monomers. Also, since it is possible to vary the mixing rate of the monomers without affecting polymerization which is controlled rather easily, manufacture is efficient.

The resin material used for the coating composition in accordance with the invention is also advangtageous since it has improved physical properties such as abrasion resistance, dyeability, hot-water resistance and prolonged shelf life. The resin material may also be moisture resistant, if desired. Moreover, material and manufacturing cost are reduced.

It is noted that any plastic articles prepared by modifying its surface in accordance with the invention have improved physical properties.

It will thus be seen that the objects set forth above, among those made apparent from the preceding description, are efficiently attained and, since certain changes may be made in carrying out the above method and in the composition set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A method for preparing a synthetic resin ophthalmic lens having a surface hard coat deposited thereon comprising:

forming a synthetic resin lens base;
chemically treating the surface of the lens base with an aequeous solution of polyethyleneglycol and an alkali metal hydroxide; and
depositing a surface hard coat on the treated lens surface comprising:
at least one monomer of formula (1):

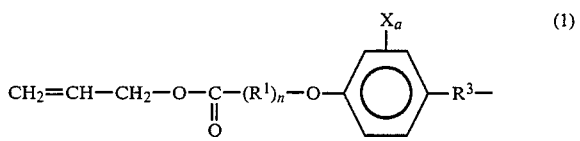

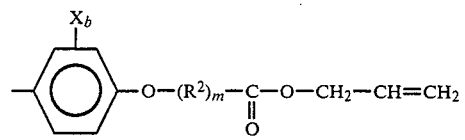

wherein $R^1$ and $R^2$ are one of $-OCH_2CH_2-$, $OCH_2CH_2CH_2-$,

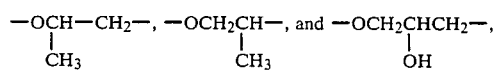

$R^3$ is one of $-O-$, $-S-$, $-SO_2-$, $-CH_2-$, and

X is halogen except fluorine, a and b are integers from 1 to 4 and m and n are integers from 0 to 4; and at least one bifunctional allyl phthalate of formula (2):

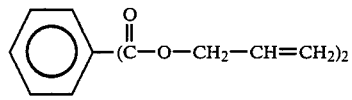

2. The method of claim 1, wherein the lens base also includes at least one monomer of formula (3):

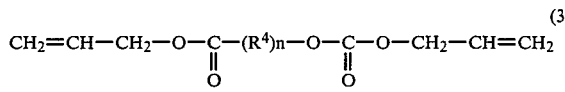

wherein $R^4$ is one of $-OCH_2CH_2-$, $-OCH_2CH_2CH_2-$,

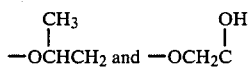

$HCH_2$ and n is an integer from 1 to 6.

3. The method of claim 1, wherein the compounds of formula (1) are present in an amount of about 25-80 weight percent and the compounds of formula (2) are present in an amount between about 5-75 weight percent.

4. The method of claim 1, wherein the momomer of formula (1) is selected from the group consisting of:
2,2-bis(4-allyloxycarbonyloxy-3,5-dichlorophenyl)-propane,
2,2-bis(4-allyloxycarbonyloxy-3,5,dibromophenyl)-propane,
2,2-bis[4-(2-allyloxycarbonyloxyethoxy)-3,5-dichlorophenyl]propane,
2,2-bis[4-(2-allyloxycarbonyloxyethoxy)-3,5-dibromophenyl]propane,
2,2-bis[4-(2-allyloxycarbonyloxyethoxy)-2,3,5,6-tetrabromophenyl]-propane,
2,2-bis[4-(2-allyloxycarbonyloxypropoxy)-3,5 dibromophenyl]propane,
2,2-bis[4-3-allyloxycarbonyloxypropoxy)-3,5-dibromphenyl]propane,
2,2-bis[4-(2-(2-allyloxycarbonyloxyethoxy)-3-hydroxypropoxy)-3,5-dibromophenyl]-propane,
2,2-bis[4-(3-allyloxycarbonyloxy)-3-hydroxypropoxy)-3,5-dibromophenyl]-propane,
bis(4-allyloxycarbonyloxy-3,5-dibromophenyl)sulfide,
bis[4-(2-allyloxycarbonyloxyethoxy)-3,5-dibromophenyl]sulfide,
bis[4-(2-allyloxycarbonyloxyethoxy)-3,5-dichlorophenyl]sulfide,
bis[4-(2-allyloxycarbonyloxyethoxy)-3,5-dibromophenyl]sulfone,
bis[4-(2-allyloxycarbonyloxyethoxy)-3,5-dibromophenyl]ether,
bis[4,(2-allyloxycarbonyloxyethoxy)-3,5-dibromophenyl]methane,
and mixtures thereof.

5. The method of claim 1, wherein the compound of formula (2) is selected from the group consisting of diallylorthophthalate, diallylisophthalate, diallylterephthalate and mixtures thereof.

6. The method of claim 2, wherein $R_4$ of formula (3) is $-OCH_2CH_2-$ and n of formula (3) is one of 2, 3, 4 or 5.

7. The method of claim 2, wherein the monomer of formula (3) is selected from the group consisting of ethyleneglycolbis(allylcarbonate), diethyleneglycolbis(allylcarbonate), triethyleneglycolbis(allylcarbonate), tetraethyleneglycolbis(allycarbonate), hexanethyleneglycolbis(allylcarbonate), polypropyleneglycolbis(allycarbonate), trimethyleneglycolbis(allylcarbonate), 3-hydroxypropoxypropanolbis(allylcarbonate), glycerolbis(allylcarbonate), diglycerolbis(allylcarbonate), triglycerolbis(allylcarbonate) and mixtures thereof.

8. The method of claim 3, wherein the compounds of formula (3) are present in the resin in an amount between about 10 to 50 weight percent.

9. The method of claim 2, wherein the resin of the lens further includes at least one of naphthalenedicarboxylic acid diallyl and diallyltartrate.

10. The method of claim 2, wherein said step of forming the lens includes polymerizing the monomers in the presence of a radical polymerization initator.

11. The method of claim 10, wherein the polymerization initiator is selected from the group consisting of hydroperoxides, dialkylperoxides, diacylperoxides, peroxydicarbonates, peroxyesters and azo compounds.

12. The method of claim 2, wherein the step of forming the lens further includes adding additives selected from the group consisting of ultraviolet light absorbers, anti-oxidants, anti-electricants, dyes, photochromic agents, stabilizers, mold releasing agents and mixtures thereof.

13. The method of claim 1, wherein the alkali metal hydroxide is one of sodium hydroxide and potassium hydroxide.

14. The method of claim 1, wherein the alkali metal hydroxide is present in an amount between about 0.1 to 30.0 weight percent.

15. The method of claim 1, wherein the polyethyleneglycol has a molar weight between about 100 to 4000.

16. The method of claim 1, further including the step of adding at least one of a non-ionic surfactant and anionic surfactant to the aqueous solution.

17. The method of claim 16, wherein the surfactant is present in an amount between about $1 \times 10^{-2}$ to 5.0 weight percent of the reaction mixture.

18. The method of claim 1, wherein the surface hard coat is formed from:
at least one silane compound chosen from the compounds having the general formula (4) and (5);
the compounds of formula (4) as follows:

wherein $R^5$ is an organic group selected from the group consisting of a hydrocarbon having from 1 to 6 carbon atoms, vinyl, methacryloxy, amino, mercapto and epoxy, $R^6$ is a hydrocarbon having 1 to 5 carbon atoms, acyl, alkoxy, alkyl or hydrogen, $R^7$ is a hydrocarbon having 1 to 5 carbon atoms, alkoxyalkyl or hydrogen and c is 0 or 1;

the compound of formula (5) as follows:

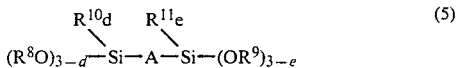

wherein $R_8$ and $R_9$ are the same or different alkyl groups having 1 to 4 carbon atoms, $R^{10}$ and $R^{11}$ are the same or different organic groups including hydrocarbon groups having from 1 to 6 carbon atoms, vinyl, methacryloxy, amino, mercapto or epoxy groups, such as a methyl group, ethyl group, propyl group, butyl group, cyclohexyl group, cyclopentyl group, vinyl group, allyl group, phenyl group or a group in which hydrogen atoms are at least partially substituted by a halogen atom, mercapto atom, glycidoxy group, (metha)acryloxy group, amino group and the like, A is a bivalent hydrocarbon or organic group including an oxygen or sulfur atom such as: $-CH_2-$, $-CH_2CH_2-$, $-CH_2CH_2CH_2$,

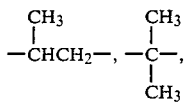

$-(CH_2)_3S(CH_2)_2-$, $-(CH_2)_3S(CH_2)_3-$, $-(CH_2)_2S(CH_2)S(CH_2)_2-$, $-(CH_2)_2O(CH_2)O(CH_2)_2-$, $-(CH_2)_3O(CH_2)_3-$, $-(CH_2)_3S(CH_2)_3S(CH_2)_3-$, and d and e are equal to 0 or 1;

(6) one of a multifunctional epoxy compound, a polyhydroxy alcohol, a polycarboxylic acid and a polycarboxylic acid anhydride;

(7) magnesium perchlorate; and (8) colloidal silica.

19. The method of claim 18, wherein said compound of formula (4) is selected from the group consisting of methyltrimethoxysilane, ethyltriethoxysilane, methyltriethoxysilane, phenyltrimethoxysilane, dimethyldimethoxysilane, phenylmethyldimethoxysilane, vinyltriethoxysilane, vinyltris(-methoxy-ethoxy)-silane, vinyltriacetoxysilane, γ-glycidoxypropyltrimethoxysilane, γ-glycidoxypropylmethyldiethoxysilane, β-(3,4-epoxycyclohexyl)ethyltrimethoxysilane, γ-aminopropyltriethoxysilane, N-bis(β-hydroxyethyl)-γ-aminopropyltriethoxysilane, N-β-(aminoethyl)-γ-aminopropyltrimethoxysilane, N-β(aminoethyl)-γ-aminopropyl(methyl)-dimethoxysilane, γ-mercaptopropyltrimethoxysilane and mixtures thereof.

20. The method of claim 18, wherein said surface hard coat includes at least two compounds selected from compounds having the formula (4) one compound having the formula (5) and compounds (6), (7) and (8).

21. The method of claim 18, wherein said multifunctional epoxy compounds are chosen from diglycydilethers of bifunctional alcohols such as (poly)ethyleneglycol, (poly)propyleneglycol, neopentylglycol, cathechol, resorcinol, alkyleneglycol and multivalent glycydilethers such as glyceride, trimethylolpropane, sorbitol, pentaerythrytol, bisphenol A, and hydrolic bisphenol A.

22. The method of claim 18, wherein said polyhydroxy alcohols are chosen from bifunctional alcohols such as (poly)ethyleneglycol, (poly)propyleneglycol, neopentylglycol, hexanediol, octyleneglycol, catechol, resorcinol, alkanediol, from trifunctional alcohols such as glycerine and trimethylolpropane and from polyhydric alcohols such as polyvinylalcohol, sorbitol and pentaerythritol.

23. The method of claim 18, wherein said polycarboxylic acids are chosen from malonic acid, succinic acid, adipic acid, azelaic acid, maleic acid, O-phthalic acid, terphthalic acid, fumaric acid, itaconic acid and oxalacetic acid.

24. The method of claim 18, wherein said polycarboxylic anhydrides are chosen from succinic acid anhydride, maleic acid anhydride, itaconic acid anhydride, 1,2-dimethyl maleric acid anhydride, phthalic acid anhydride, hexahydrophthalic acid anhydride and naphthalic acid anhydride.

25. The method of claim 18, wherein said colloidal silica has a particle diameter between about 1–100 mu.

26. The method of claim 18, wherein said surface hard coat includes 50–800 parts by weight of compounds of formulas (4) and (5), about 100 parts by weight of said colloidal silica, 50–600 parts by weight of said at least one multifunctional epoxy compound, a polyhydroxy alcohol, a polycarboxylic acid and a polycarboxylic acid anhydride, and magnesium perehlorate in an amount between about 0.1–5.0 percent.

27. The method of claim 1, wherein said surface hard coat is a photosetting surface hard coat and includes at least one compound having at least two (metha)acryl groups and a photopolymerization initiator.

28. The method of claim 27, wherein said acryl compound is selected from the group consisting of di- or tri-(metha)acrylates of (poly)ethyleneglycol, (poly)-propyleneglycol, hexandiol, neopentylglycol, glycerine, or trimetyrolpropane; a tri, tetra or hexa(metha)acrylate of pentaeryslitol, dipentaerythrytol, and sorbitol, a polyhdric acrylate, a siliconacrylate having the acryl group at the silicon oligomer terminal, a melamine acrylate initiated with methylolmelamine and 2-hydroxyethyl(metha)acrylate, a di(metha)acrylate, a polyurethaneacrylate of a polyester and mixtures thereof.

29. The method of claim 28, further including a reactive deluents selected from the group consisting of methyl(metha)acrylate, ethyl(metha)acrylate, 2-ethylhexylacrylate, butyl(metha)acrylate, glycidyl(metha)acrylate, (metha)acrylonitrile, hydroxyethyl(metha)acrylate, hydroxypropyl(metha)acrylate, vinyl acetate, styrene, α-methylstyrene, α-chlorostyrene, (metha)acrylamido, vinylnaphthalene, vinylcarbazole, γ-methacryloiloxypropyltrimethyoxysilane, and β-acryloiloxyethyltrimethoxysilane.

30. The method of claim 27, wherein said photopolymerization initiator is selected from the group consisting of benzoinethers such as benzoin, benzoinmethylether and benzoinethylether, benzophenones, acetophenones, butyloin, anthraquinone, diphenyldisulfide, benzyldimethylketals, and azoisobutylnitril.

31. The method of claim 27, wherein said surface hard coat further includes a photosentizer selected from the group consisting of n-butylamine, di-n-butylamine, tri-n-butylphosphineallyltio urea, diethylaminoethylmethacrylate, triethylenetetramine and mixtures thereof.

32. The method of claim 27, wherein said surface hard coat composition further includes at least one of a nonionic surfactant, thixotropic agent, silicon surfactant, slipping agent and storage stabilizer.

33. The method of claim 32, wherein said stabilizer is one of benzyltrimethylammonium, benzothiazole and hydroquinone.

34. The method of claim 1, wherein said hard coat is deposited on said lens by one of dip coating, spray coating, roll coating, spin coating and flow coating.

35. The method of claim 1, wherein said hard coat is deposited on said lens to a thickness between about 1 to 30 μm.

36. The method of claim 1, wherein a single or multilayer film of an inorganic dielectric material is formed as an anti-reflection coating on the surface hard coat after deposition.

37. The method of claim 36, wherein said dielectric material includes SiO, SiO$_2$, Si$_3$N, TiO$_2$, ZrO$_2$, Al$_2$O$_3$, MgF$_2$, Sb$_2$O$_3$, CaF$_2$, CeO$_2$, CeF$_3$, Na$_3$AlF$_6$, La$_2$F$_3$, PbF$_3$, NdF$_3$, Pr$_6$O$_{11}$, ThO$_2$, ThF$_4$, ZnS, Ge, PbTe, Tl$_2$O$_3$, HfO$_2$, Ta$_2$O$_5$, Y$_2$O$_3$, and Yb$_2$O$_3$.

38. Synthetic resin opthalinic lens comprising:
a synthetic resin lens based, the surface of said base ceremically treated with an aqueous solution of polyethyleneglycol and an alkali metal; and
a surface hand, coat deposited on the treated surface, wherein the synthetic resin lens is formed from:
at least one monomer of formula (1):

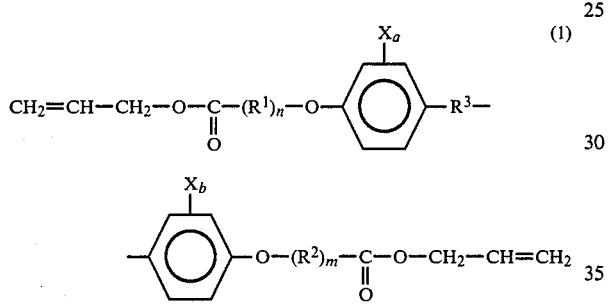

(1)

wherein R$^1$ and R$^2$ are one of —OCH$_2$CH$_2$—, OCH$_2$CH$_2$CH$_2$—,

—OCH—CH$_2$—, —OCH$_2$CH—, and —OCH$_2$CHCH$_2$—,
　　|　　　　　　|　　　　　　　　　|
　　CH$_3$　　　　CH$_3$　　　　　　　OH R$^3$ is one of —O—, —S—, —SO$_2$—, —CH$_2$—, and

X is halogen except fluorine, a and b are integers from 1 to 4 and m and n are integers from 0 to 4; and
at least one bifunctional allyl phthalate of formula (2):

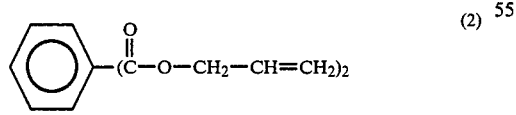

(2)

39. The synthetic resin ophthalmic lens of claim 38, wherein the lens base also includes at least one monomer of formula (3):

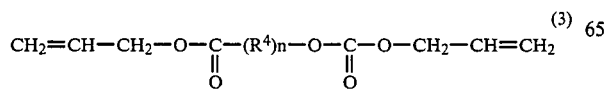

(3)

wherein R$^4$ is one of —OCH$_2$CH$_2$—, —OCH$_2$CH$_2$CH$_2$—,

CH$_3$　　　　　　　　OH
　　|　　　　　　　　　　|
—OCHCH$_2$ and —OCH$_2$CHCH$_2$ and n is an integer from 1 to 6.

40. The synthetic resin ophthalmic lens of claim 38, wherein the surface hard coat is a silane resin formed from:
at least one silane compounds chosen from the compounds having the general formula (4) and (5);
the compounds of formula (4) as follows:

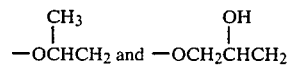

(4)

wherein R$^5$ is an organic group selected from the group consisting of a hydrocarbon having from 1 to 6 carbon atoms, vinyl, methacryloxy, amino, mercapto and epoxy, R$^6$ stands for a hydrocarbon having 1 to 5 carbon atoms, acyl, alkoxy, alkyl or hydrogen, R$^7$ is a hydrocarbon having 1 to 5 carbon atoms, alkoxyalkyl or hydrogen and c is 0 or 1;
the compounds of formula (5) as follows:

(5)

wherein R$_8$ and R$_9$ are the same or different alkyl groups having 1 to 4 carbon atoms, R$^{10}$ and R$^{11}$ are the same or different organic groups including hydrocarbon groups having from 1 to 6 carbon atoms, vinyl, methacryloxy, amino, mercapto or epoxy groups, such as a methyl group, ethyl group, propyl group, butyl group, cyclohexyl group, cyclopentyl group, vinyl group, allyl group, phenyl group or a group in which hydrogen atoms are at least partially substituted by a halogen atom, mercapto atom, glycidoxy group, (metha)acryloxy group, amino group and the like, A is a bivalent hydrocarbon or organic group including an oxygen or sulfur atom such as: —CH$_2$—, —CH$_2$CH$_2$—, —CH$_2$CH$_2$CH$_2$,

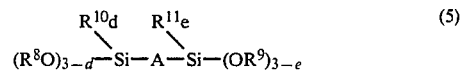

—(CH$_2$)$_3$S(CH$_2$)$_2$—,　　　　—(CH$_2$)$_3$S(CH$_2$)$_3$—,
—(CH$_2$)$_2$S(CH$_2$)S(CH$_2$)$_2$—,　—(CH$_2$)$_2$O(CH$_2$)$_2$O(CH$_2$)—,　　　　—(CH$_2$)$_3$O(CH$_2$)$_3$—,
—(CH$_2$)$_3$S(CH$_2$)$_3$S(CH$_2$)$_3$—, and d and e are equal to 0 or 1;
one of a multifunctional epoxy compound, a polyhydroxy alcohol, a polycarboxylic acid and a polycarboxylic acid anhydride;
magnesium perchlorate; and
colloidal silica.

41. The synthetic resin ophthalmic lens of claim 38, wherein said surface hard coat is a photosetting surface hard coat and includes at least one compound having at least two (metha)acryl groups and a photopolymerization initiator.

42. The synthetic resin ophthalmic lens of claim 38, wherein said hard coat is between about 1 to 30 μm thick.

* * * * *